June 3, 1930.  H. APEL  1,761,461
SWITCHBOARD AND THE LIKE
Filed Feb. 15, 1928
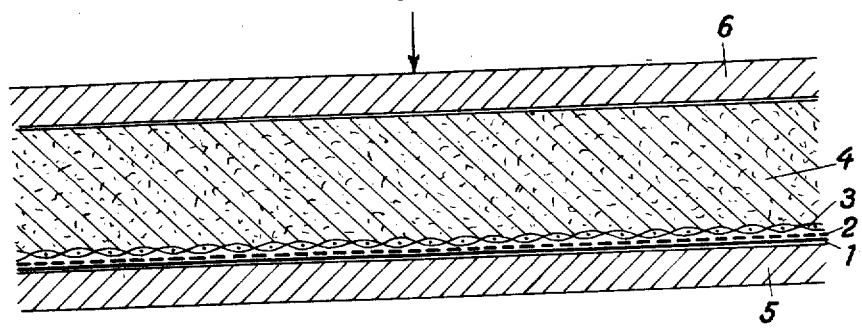
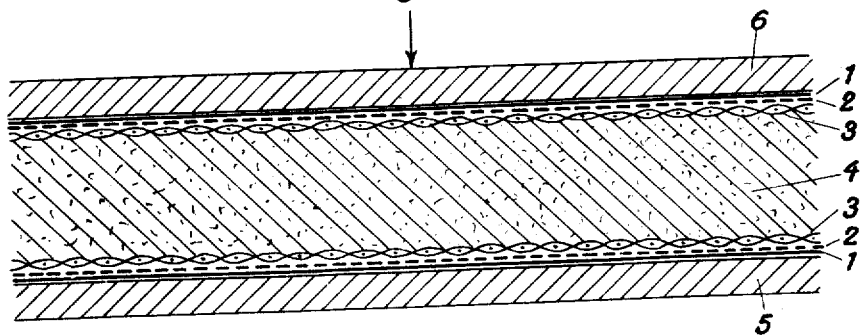
Inventor:
Hermann Apel,
By Byrnes Townsend & Brickenstein,
attorneys.

Patented June 3, 1930

1,761,461

UNITED STATES PATENT OFFICE

HERMANN APEL, OF BERLIN-WILMERSDORF, GERMANY

SWITCHBOARD AND THE LIKE

Application filed February 15, 1928, Serial No. 254,574, and in Germany March 15, 1927.

The material usually employed for switchboards, switch walls and the like is marble which however is open to objection on account of its expensiveness, its weight or high specific gravity and its fragility or liability to breaking on transportation and cracking on producing holes or recesses therein for installation or mounting purposes and the like.

For this reason many attempts have been made heretofore to substitute for marble a more suitable material such as artificial stone and certain metals especially iron, but all of the suggestions hitherto made in this regard have not met with any important degree of practical success due to various disadvantages inherent in the suggested materials.

The object of my invention is to remedy these defects and with this object in view I construct the board by composing and uniting at least three distinct individual materials or members to form a compound plate of the dimensions and properties most desirable in a switchboard or the like. In particular I employ, as a main or inner member, a sheet or plate consisting of an artificial or plastic, hardened mass such as plaster of Paris, cement, stone-wood or the like, and as secondary or outer members or layers I employ a metallic sheet, preferably of iron and of the same circumferential size as that of the main member, and a layer embedded between the latter and the metallic sheet, the said layer including a substance which will act as an agglutinant or binder to firmly adhere to the metallic sheet and firmly unite the latter with the main member, but which will retain at the same time a sufficient degree of elasticity to conform to the different coefficients of expansion of the main member and the metallic sheet.

Stone-wood (Steinhölz) is a building material composed of a binding agent and a filler. The binding agent is a mixture of magnesia and magnesium chloride, while the filler is usually sawdust or wood pulp. Stone-wood is known under various other names, such as Xylolith, Doloment, Durament, Torgament, Eubolith, etc., etc. Besides the sawdust and wood pulp many other filling materials are used in the manufacture of stone-wood, for example, vegetable and animal fillers, such as pieces of cork, cork meal, straw meal, chaff, wool, hair, fibers of cotton, hemp, flax, bast, and other textile materials. Mineral fillers may also be used, such as asbestos, kieselguhr, glass wool, etc. The composition and method of manufacture of stone-wood (Steinhölz) are described on pages 618 ff. of volume 10 of Ullmann (Enzyklopädie der technischen Chemie), Urban & Schwarzenberg, Berlin, Wien, 1922.

In some cases I prefer to enclose the main member between two metallic sheets and intermediate binding layers. The adhesive substance forming the intermediate layer consists of a suitable binder such as bitumen, asphaltum, tar, lacquer or the like which will not attack or corrode the metallic sheet but rather protect the same from oxidation, and I preferably use an appropriate lacquer containing zinc-white, so-called enamel-lacquer, which will not penetrate or soak through the main member.

Usually I embed a coarse textile fabric, preferably a jute fabric, in the adhesive substance forming the intermediate layer and in some cases I employ a wooden main member consisting of veneers piled up crosswise and glued together so as to form a plate or board which will not be liable to warping.

Other detailed features of the invention will be hereinafter specifically described and then pointed out in the claims.

The inventive idea involved is capable of expression in a variety of mechanical forms two of which, for the purpose of illustration, are shown in the accompanying drawings, but it is to be understood that said drawings are for the purpose of illustration only and not for the purpose of defining the limits of the invention, reference being had to the claims for the purpose.

In the accompanying drawings forming a part of this specification, Fig. 1 is a fragmentary cross-section of a switchboard constructed according to the present invention and lad with an iron sheet on one side only; Fig. 2 is a similar sectional view of the modification in which the main member or body is sandwiched between two iron sheets.

As will be seen in Fig. 1, molding or compressing plates 5 and 6 may be used in manufacturing the switchboard. The two plates are perfectly even and smooth. An iron sheet 1 is placed on the bottom plate 5 and adhesive substance 2 is applied to the upper surface of the sheet 1 to form a thick layer thereon for the reception of the coarse fabric 3 which is evenly distributed over the layer 2 so as to be in perfect and intimate contact therewith. In lieu of a textile fabric any other appropriate means e. g. a suitable granular material may be used such as sand, bricks broken or crushed to form a fine granular mass and the like. The layer or substance 2 is allowed to dry and when perfectly dry, a molding frame (not shown) is placed over the iron sheet 1 to enclose the same circumferentially. The molding frame is bottomless and of sufficient height to allow of producing therein a switchboard of any desirable thickness. The frame thus placed over the iron sheet 1, is subsequently filled with the plastic material 4 and the top plate 6 is then put in the frame and onto the material 4 whereupon an even pressure is to be exercised on the plate 6. Due to the pressure the plastic material will be evenly compressed and the iron sheet 1 will be brought in complete contact with the bottom plate 5 throughout the whole of the surface thereof, so as to be flattened and perfectly smoothed by such compression. The pressure is maintained for a full setting period that is to say, until the plastic material 4 has matured and hardened.

As a result of the iron sheet 1 at the end of the pressure operation is firmly united with the hardened plastic material and the product or switchboard thus obtained will permanently maintain the shape received by the pressure operation. The compressed and hardened material 4 is allowed to dry and the switchboard is then ready for further treatment or installation.

It will be seen that in the process of manufacturing switchboards according to the present invention it is not necessary to spread or flatten the iron sheet, prior to its use, since the pressure operation automatically acts to adjust the sheet and flatten the same so that the outer surface of the sheet will be perfectly even and smooth. If it is desired to have both sides of the switchboard covered with sheet iron, a sheet 1 coated with a layer 2 or 2 and 3 and prepared in the manner as hereinbefore described, is to be placed on top of the plastic material 4 in the molding frame, as shown in Fig. 2 before the top plate 6 is inserted in the frame. By the subsequent compressing operation indicated by an arrow in the drawings, both iron sheets will be firmly united with the main body 4 and given even and smooth outer surfaces owing to the intimate contact under pressure with the even, smooth faces of the compressing plates 5 and 6.

If it is desired to employ previously produced plates made of any suitable artificial or plastic material or of wood as hereinbefore intimated, the process of uniting the same with the iron sheets is almost the very same as before. The iron sheet 1 is coated with a suitable agglutinant or binder 2 and the elastic fabric 3 is placed and evenly distributed thereover. The previously produced hard plate then is inserted into the frame and a suitable pressure is applied, as above described, in order to bring about intimate contact and connection between the plate and the iron elements 1, 2, 3 and to flatten the iron sheet at the same time and give the same a smooth and even outer surface. Pressure is continued to act until the binder 2 is sufficiently rigid. In most cases it will be advisable, however, to first coat the sheet 1 with the binder 2 and when the fabric 3 has been placed thereon to then coat also the upper or outer surface of the fabric with the agglutinant, in order to ensure a more reliable union between the elements of the switchboard.

Switchboards manufactured according to the present invention are comparatively light in weight, strong and durable and can be readily worked or machined. Conducting wires and devices to be attached to the back of the switchboard may be connected therewith by means of screws without further ado and without perforating the frontal iron sheet. The work required for such mounting purposes amounts to only one fourth of that to be bestowed thereon in case of a marble board, so that time and labor will be economized. The front surface of the switchboard remains perfectly smooth since screws or rivets do not penetrate thereinto. The front surfaces of the iron sheets may be decorated or refined in any appropriate manner such as by polishing, browning or painting the same.

What I claim is:

1. As a new article of manufacture a composite board adapted for use as a switchboard, comprising a plate of hardened non-elastic plastic material, a metallic sheet attached to one side of the side plate and a layer of adhesive material embedded between the plate and the sheet firmly uniting the said plate with the said sheet and having a sufficient elasticity to conform to the different coefficients of expansion of the metal sheet and plastic material.

2. As a new article of manufacture, a switchboard comprising a plate of hardened non-elastic plastic material, a metallic sheet attached to one side of the said plate, and an intermediate layer of adhesive material including a textile fabric firmly binding together the said plate and sheet.

3. As a new article of manufacture, a switchboard comprising a plate of hardened non-elastic plastic material, metallic sheets attached to both sides of the said plate and intermediate layers of adhesive material including a textile fabric firmly binding together the said plate and sheets.

4. The process of producing a composite board which comprises applying a suitable adhesive material to an iron sheet, placing a coarse textile fabric on the layer of adhesive material, placing a layer of a suitable plastic material thereon and subjecting the thus constructed formation to a suitable pressure in order to ensure firm interconnection and flatten the iron sheet to complete evenness.

5. A composite board adapted to be used as a switchboard comprising a plate of hardened inorganic cementitious material and a sheet of metal attached to one side thereof by means of a layer of adhesive material having a sufficient elasticity to conform to the different coefficient of expansion of said plate and said sheet of metal.

6. A switchboard formed of a plate of stone wood, and a sheet of metal attached to one side of said plate by means of an adhesive material having a sufficient elasticity to conform to the different coefficients of expansion of said plate and said sheet of metal.

7. A switchboard formed of a plate of stone-wood and a sheet of metal attached to one side of said plate by means of a layer of adhesive material including a textile fabric.

In testimony whereof, I affix my signature.

HERMANN APEL.

CERTIFICATE OF CORRECTION.

Patent No. 1,761,461.            Granted June 3, 1930, to

HERMANN APEL.

It is hereby certified that error appears in the printed specification of the above numbered patent requiring correction as follows: Page 2, line 115, claim 1, for "side plate" read "said plate"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.

non-elastic plastic material, metallic sheets attached to both sides of the said plate and intermediate layers of adhesive material including a textile fabric firmly binding together the said plate and sheets.

4. The process of producing a composite board which comprises applying a suitable adhesive material to an iron sheet, placing a coarse textile fabric on the layer of adhesive material, placing a layer of a suitable plastic material thereon and subjecting the thus constructed formation to a suitable pressure in order to ensure firm interconnection and flatten the iron sheet to complete evenness.

5. A composite board adapted to be used as a switchboard comprising a plate of hardened inorganic cementitious material and a sheet of metal attached to one side thereof by means of a layer of adhesive material having a sufficient elasticity to conform to the different coefficient of expansion of said plate and said sheet of metal.

6. A switchboard formed of a plate of stone wood, and a sheet of metal attached to one side of said plate by means of an adhesive material having a sufficient elasticity to conform to the different coefficients of expansion of said plate and said sheet of metal.

7. A switchboard formed of a plate of stone-wood and a sheet of metal attached to one side of said plate by means of a layer of adhesive material including a textile fabric.

In testimony whereof, I affix my signature.

HERMANN APEL.

CERTIFICATE OF CORRECTION.

Patent No. 1,761,461.  Granted June 3, 1930, to

HERMANN APEL.

It is hereby certified that error appears in the printed specification of the above numbered patent requiring correction as follows: Page 2, line 115, claim 1, for "side plate" read "said plate"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.